(12) United States Patent
Maggi (10) Patent No.: US 12,085,434 B2
(45) Date of Patent: Sep. 10, 2024

(54) METERING EQUIPMENT FOR FOOD PRODUCTS

(71) Applicant: Arturo Maggi, Cerro al Lambro (IT)

(72) Inventor: Arturo Maggi, Cerro al Lambro (IT)

( * ) Notice: Subject to any disclaimer, the term of this patent is extended or adjusted under 35 U.S.C. 154(b) by 210 days.

(21) Appl. No.: 17/753,435

(22) PCT Filed: Sep. 14, 2020

(86) PCT No.: PCT/EP2020/075644
§ 371 (c)(1),
(2) Date: Mar. 3, 2022

(87) PCT Pub. No.: WO2021/058312
PCT Pub. Date: Apr. 1, 2021

(65) Prior Publication Data
US 2022/0316930 A1  Oct. 6, 2022

(30) Foreign Application Priority Data
Sep. 23, 2019 (IT) .......................... 102019000016982

(51) Int. Cl.
| | | |
|---|---|---|
| *G01F 11/02* | (2006.01) | |
| *G01F 15/00* | (2006.01) | |
| *G01F 15/12* | (2006.01) | |

(52) U.S. Cl.
CPC .......... *G01F 11/021* (2013.01); *G01F 15/005* (2013.01); *G01F 15/006* (2013.01); *G01F 15/12* (2013.01)

(58) Field of Classification Search
CPC .... G01F 11/021; G01F 15/005; G01F 15/006; G01F 15/12; G01F 15/14; G01F 11/029;
(Continued)

(56) References Cited

U.S. PATENT DOCUMENTS 2,527,341 A * 10/1950 Walter ...................... B65B 3/32
137/625.22
2,756,907 A * 7/1956 Hill .......................... B65B 3/32
92/13.6
(Continued)

FOREIGN PATENT DOCUMENTS

| EP | 0 994 333 A1 | 4/2000 | |
| IT | MI20010480 A1 * | 9/2002 | ............... B65B 3/32 |

OTHER PUBLICATIONS

ESR; Italian Patent Office; the Hague; May 20, 2020.
ISR; European Patent Office; NL; Nov. 25, 2020.

*Primary Examiner* — Donnell A Long
(74) *Attorney, Agent, or Firm* — Patshegen IP; Moshe Pinchas (57) ABSTRACT

Metering equipment (A) for food products, including metering means (Di) defined by plunger means (Pi) and nozzle dispenser means (Ui) connected to said plunger-cylinder means (Ci, Pi) and suitable for dispensing volumetric quantities of said product; many-ways-valve distributing means (Vi) connected to said plunger-cylinder means (Ci, Pi) and to said nozzle dispenser means (Ui) placed in-between; said valve means (Vi) are being formed by a shaft (K) provided with a series of pass-through holes and suitable for turning around an own central lengthwise axis (X) inside the cylinder (Z) casing and for translating in a horizontal direction parallel to said central axis (X).

5 Claims, 9 Drawing Sheets (58) Field of Classification Search
CPC .... G01F 11/42; G01F 11/023; B65B 2210/08; B65B 3/32; B65B 39/003; A23G 9/28
See application file for complete search history.

(56) References Cited

U.S. PATENT DOCUMENTS

| | | | | |
|---|---|---|---|---|
| 3,358,888 A | * | 12/1967 | Carl | G01F 11/021 222/250 |
| 4,027,785 A | * | 6/1977 | Edstrom | G01F 11/021 222/309 |
| 4,366,918 A | * | 1/1983 | Naka | B01F 35/882 222/134 |
| 2001/0009097 A1 | | 7/2001 | Cathenaut et al. | |

\* cited by examiner

METERING EQUIPMENT FOR FOOD PRODUCTS

The present invention relates to a metering equipment.

Especially, the referred invention is advantageously used to carry out the measured metering/dosing of liquid and creamy food products, as such for example creams and equivalent soft goods, the following description will explicitly refer to without losing the general character.

Currently known and commonly in use metering equipment in the food industry show the disadvantage of being at least partially disassembled once the production run with a determined product is finished, in order to allow the extraction and removal of its own structural and operating components, as such for example measuring pistons, nozzles, hoppers, measuring bodies, etc, that have to be subjected to a washing and/or disinfection cycle outside the equipment itself (COP Cleaning-Out-of-Place).

Such known operative structural components are generally furthermore realized in metal alloys, such as stainless steel or equivalent materials, or materials whose disinfection must be necessarily achieved at high temperatures and with very aggressive detergent, that frequently involve not desired expanding side effects and damages in portions of the components themselves, such as for example in gaskets.

Aim of the present invention is to realize a metering equipment designed to overcome the above-mentioned drawbacks.

Especially, the aim of the present invention is to realize a metering equipment for food products designed to be rapidly and effectively washed and disinfected after the production run with a determined food product without any substantial modification to the structural order nor any disassembling of portions of the equipment itself.

Another aim of the present invention is to provide for metering equipment for food products showing operating components realized in inert materials and/or very low thermal expansion coefficients.

The structural and functional features of the present invention and the advantages thereof compared to the prior art will be more evident from the claims below, and especially from an examination of the following description, referred to the attached figures, that show a preferred, but not limitative, embodiment of a metering equipment, in which:

With a particular reference to the attached figures, with A the metering equipment designed to be used to carry out, with a discontinuous (step by step) functionality, the volumetric measuring of liquid or creamy food products, such as for example creams or pasty equivalent products, is globally referred to.

Figure 1:
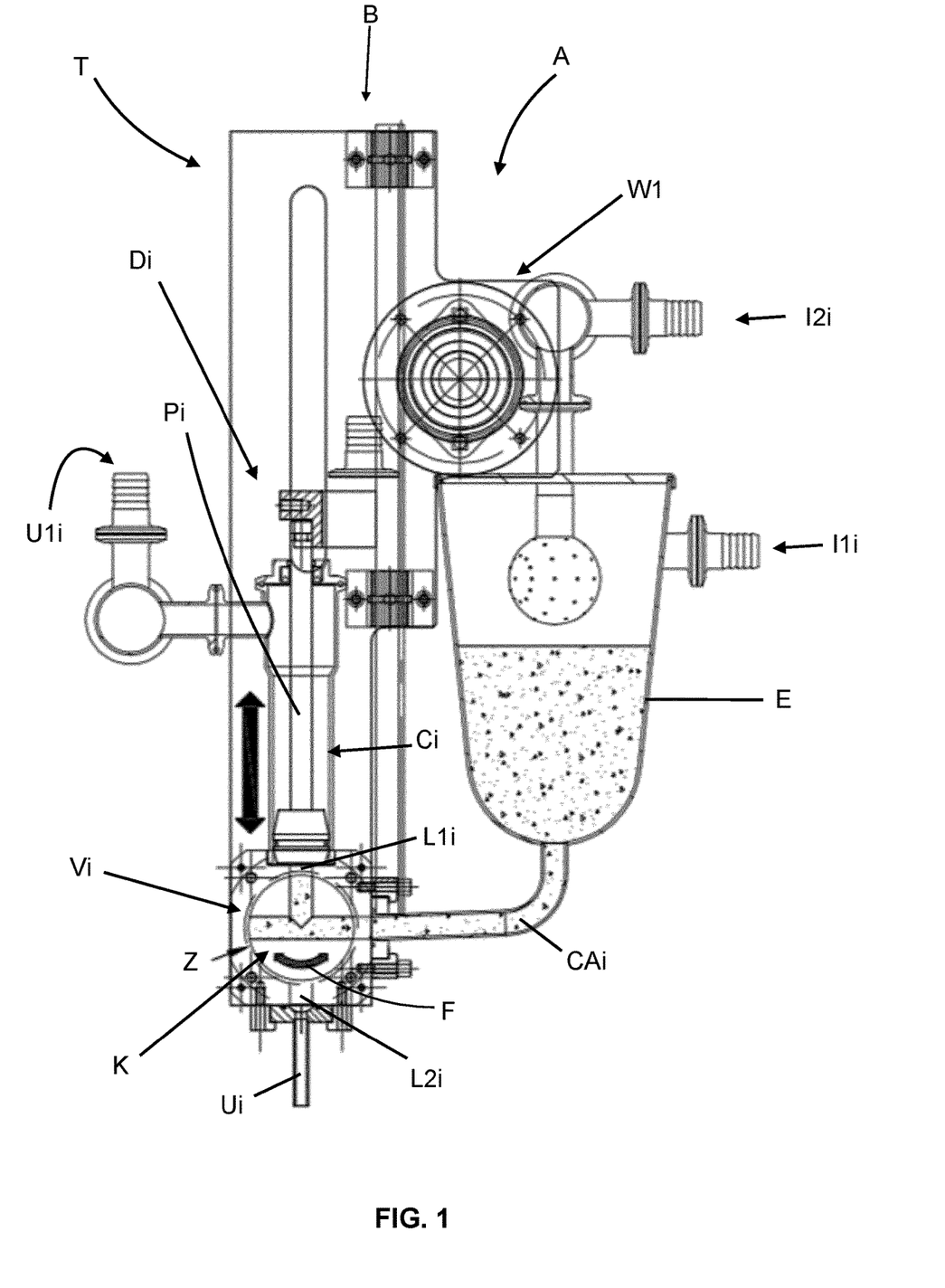
FIG. 1 is a schematic side view of the equipment herein, represented in a cross-section.
Figure 2:
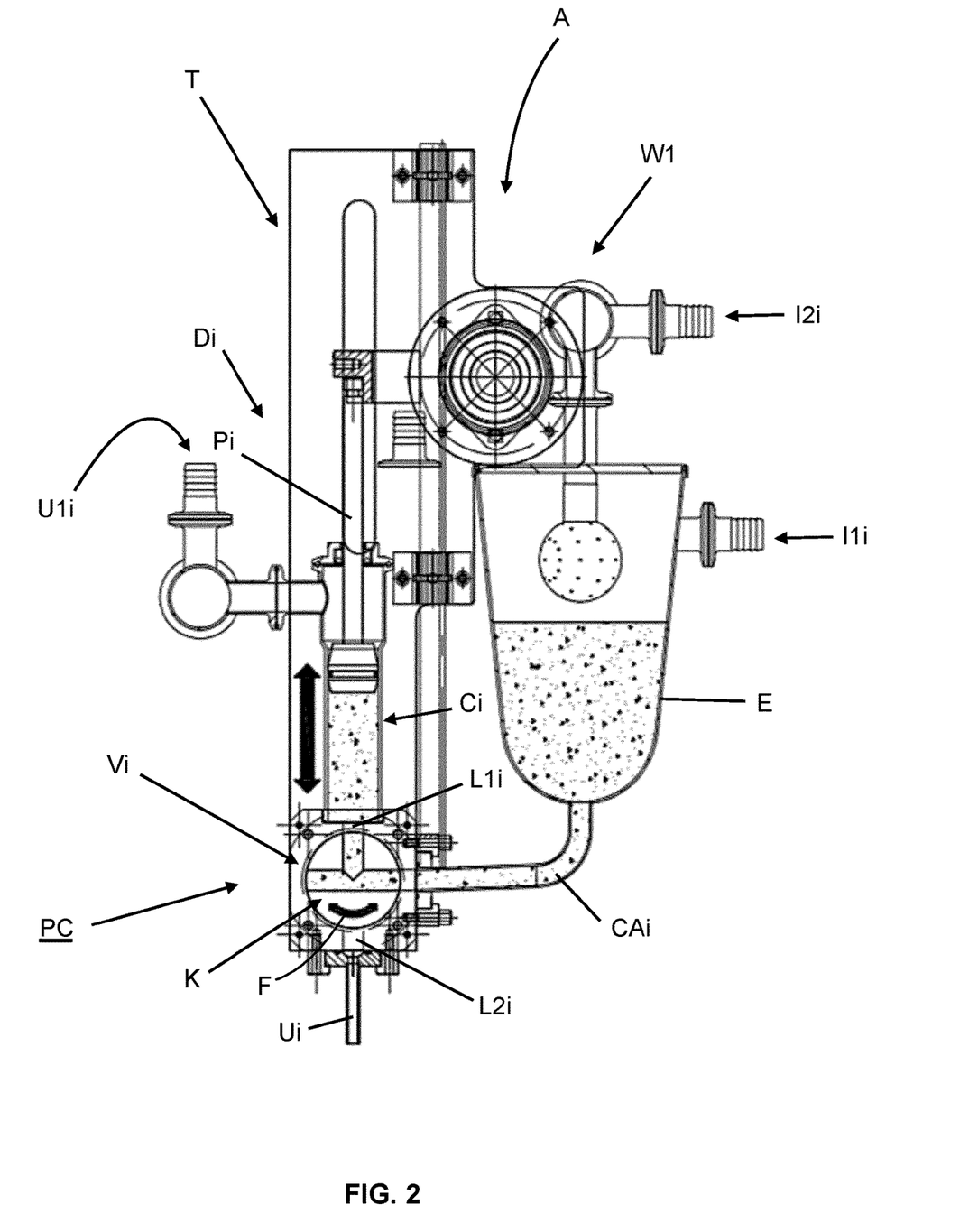
FIG. 2 represents the equipment of FIG. 1 shown at a first stage of the metering run.
Figure 3:
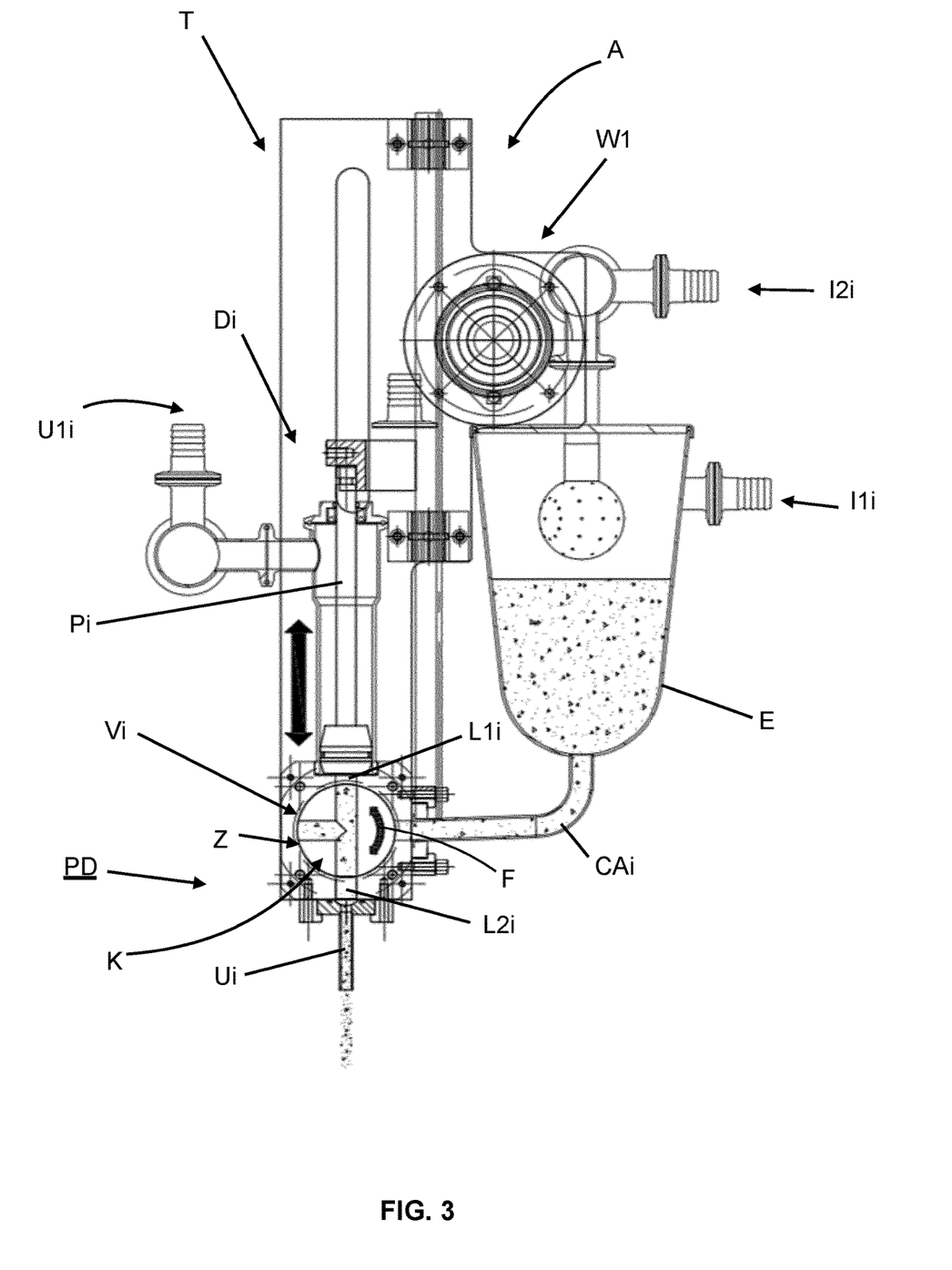
FIG. 3 represents the equipment of FIG. 1 shown at a second stage of the metering run.
Figure 5:
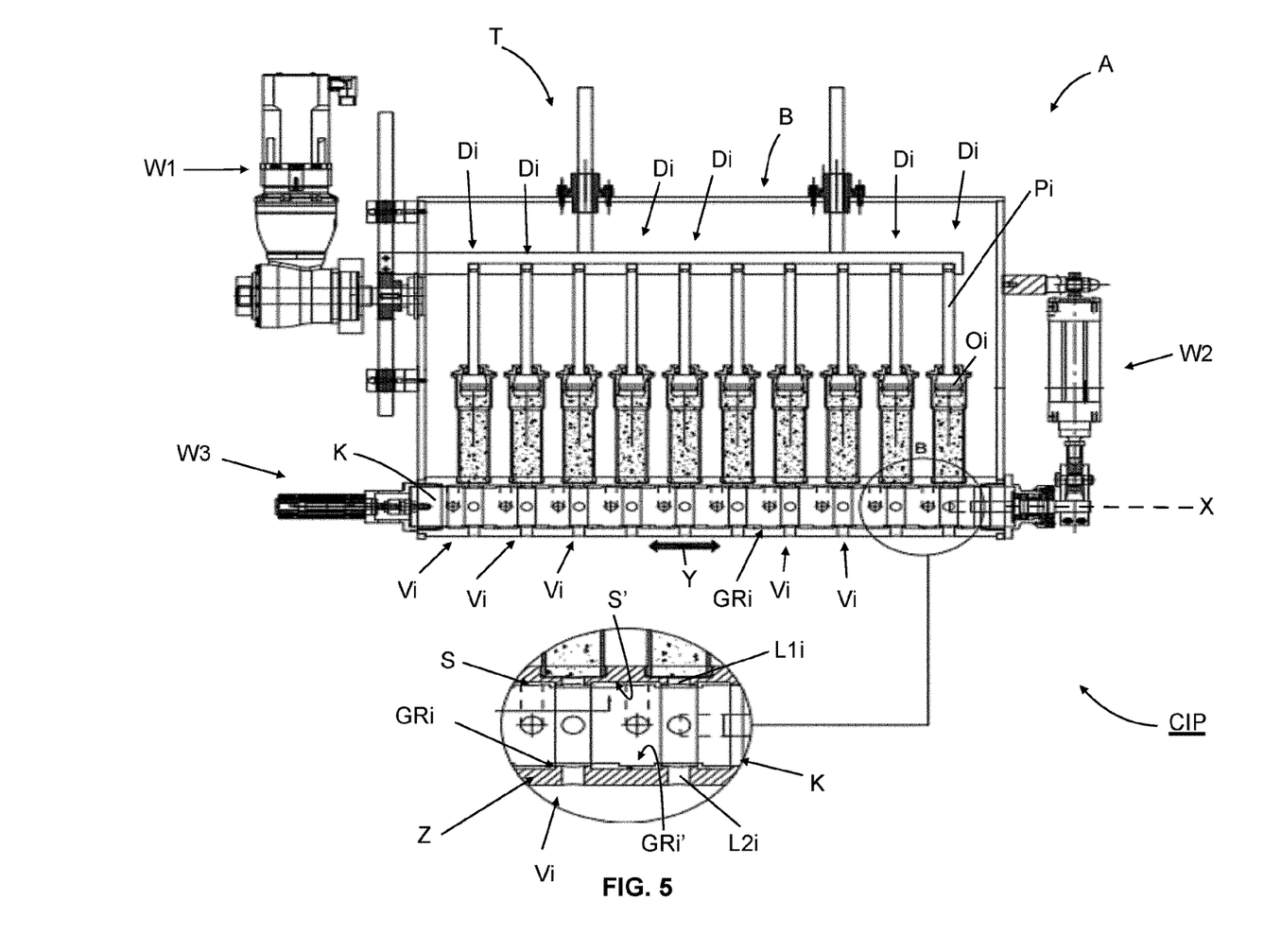
FIG. 5 is a front view in cross-section, with a highlighted portion on an enlarged scale, of the equipment herein shown in the operative position of FIG. 4.
Figure 6:
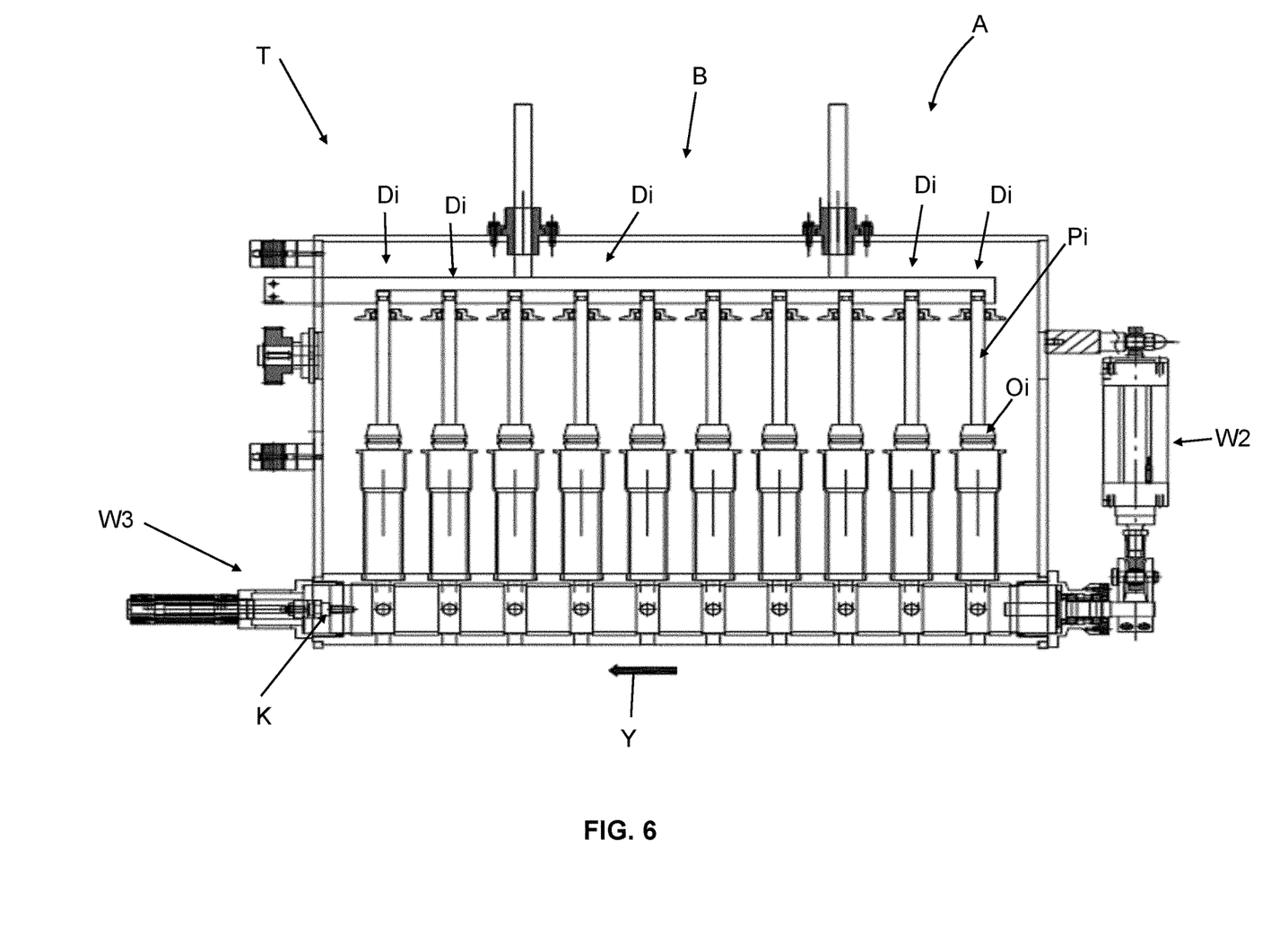
FIG. 6 represents the equipment herein shown in an own maintenance position.
Figure 7:
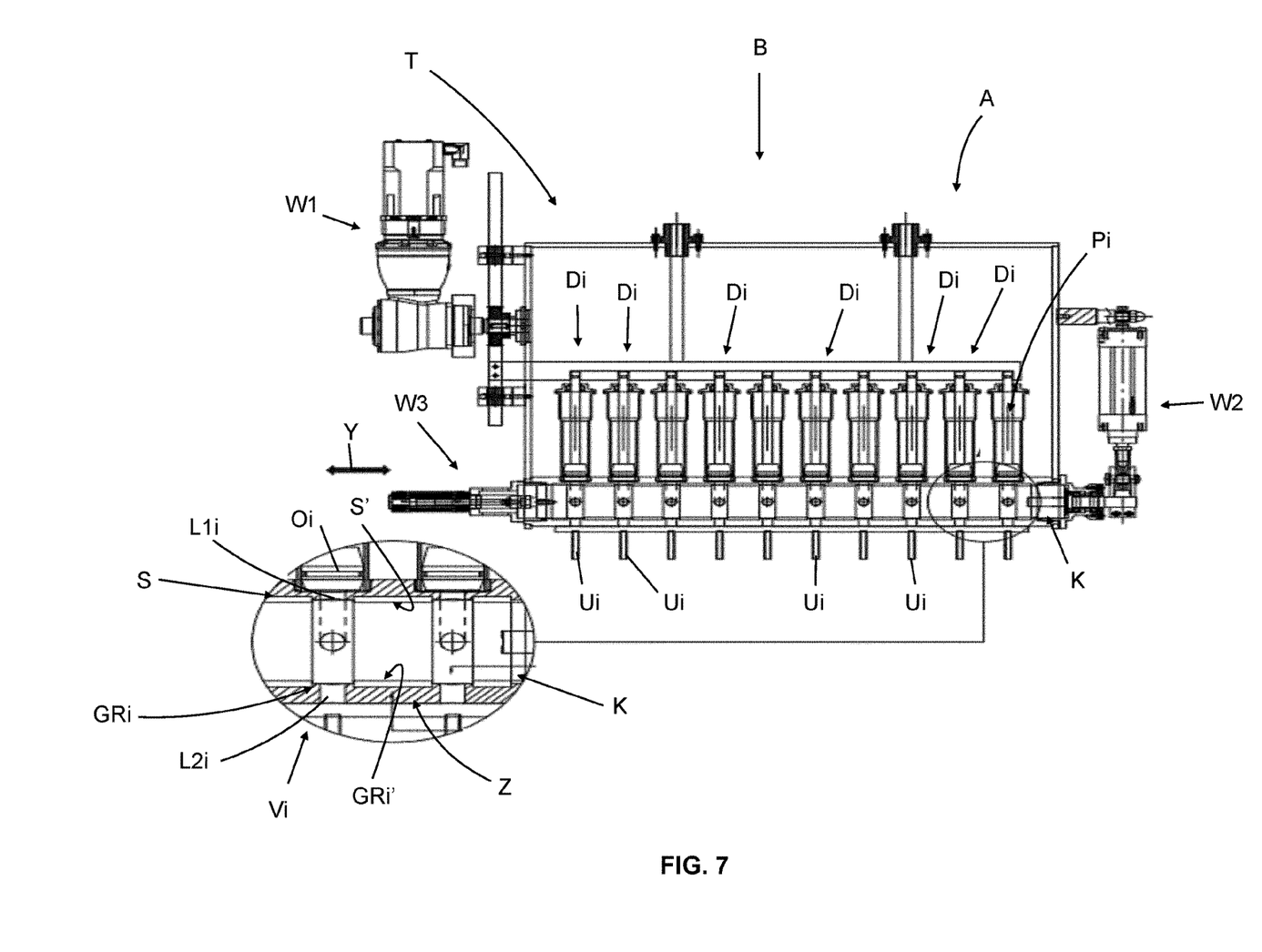
FIG. 7 is a front view in cross-section, with a highlighted portion on a enlarged scale, of the equipment herein shown in the operative position of FIG. 1.

According to what better illustrated in FIGS. 1, 2, 3, and in FIG. 7, the metering equipment A includes a substantially lattice frame structure T designed to support a battery B of vertical volumetric metering devices Di (ten measuring devices shown in FIG. 7), each one of the volumetric metering devices Di is defined by a related cylindric hollow body Ci within which a respective metering plunger or piston P is designed to vertically flow, with an end equipped with a suitable gasket Oi, under the thrust of a centralised servomotor group W1 (FIGS. 6 and 5). The body Ci is furthermore equipped with a two-way distribution/supplying T-valve Vi and connected, through a suitable upper ductwork L1i, to the upper end of the hollow body Ci itself and to the lower end, through a suitable lower ductwork L2i, to a related measuring nozzle Ui for the measured metering of the food product.

Each valve Vi is connected, through a related feeding duct CAi, to a container E supported by a frame T and designed to define a collection tank for the food product to be metered. The set of valves Vi of the battery B of the metering devices Di is defined by and formed above a shaft K equipped with a plurality of through holes and designed to rotate (arrow F), under the thrust of an actuator W2 supported by the frame T, around an own central axis X lengthwise within a cylindric hollow casing Z to carry, during the production run of the equipment A, each valve Vi from a suction and charging position PC (FIG. 2) of the food product in the measuring device Di, at which the upper duct L1i and the feeding duct CAi are open and communicating between each other through the valve Vi itself, in a metering position PD of the food product (FIG. 3), at which the feeding duct CAi and the lower duct L2i connected to the nozzle Ui are open and communicating between each other through the valve Vi itself.

Figure 4:
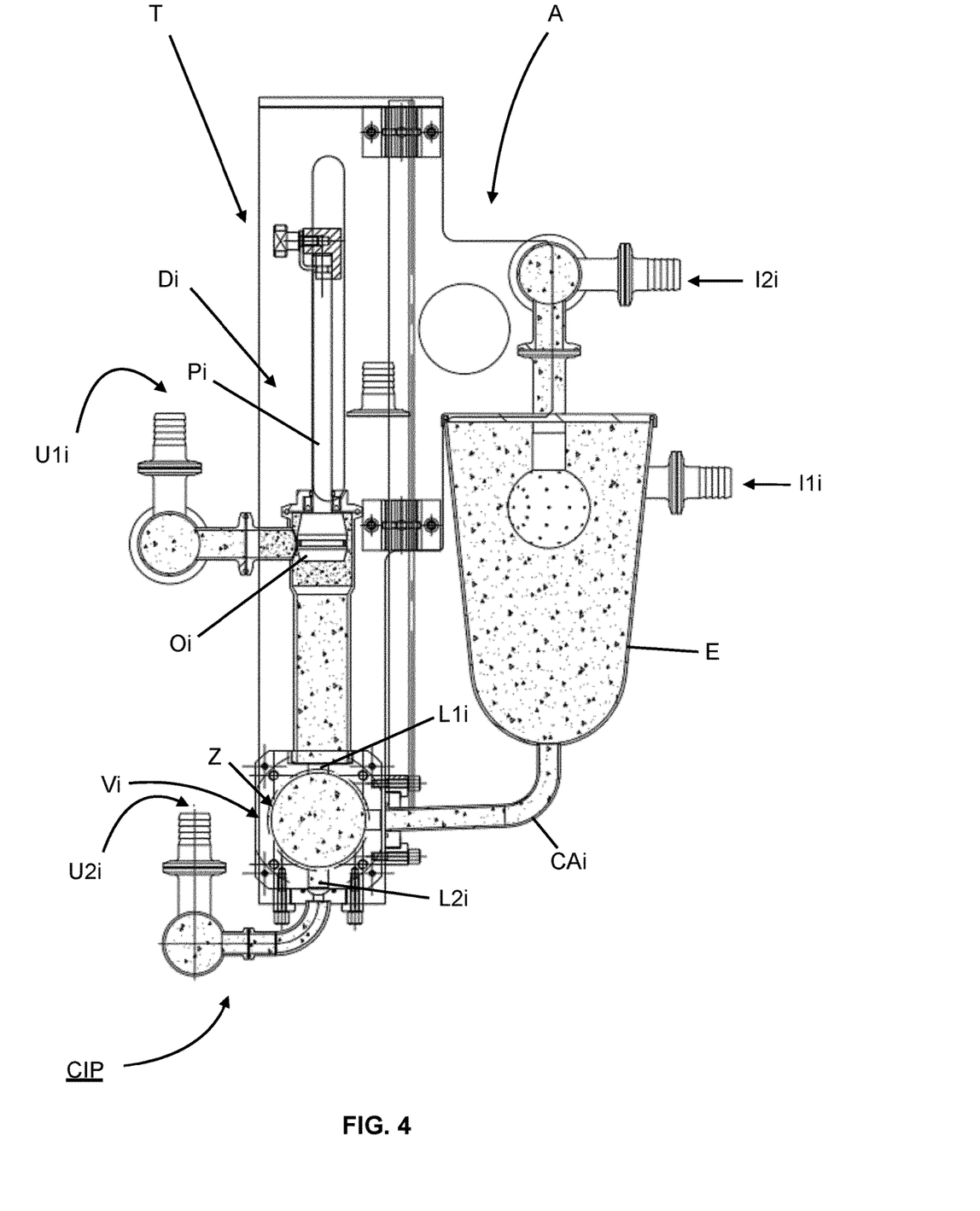
FIG. 4 represents the equipment herein shown in an own operative position corresponding to a washing and disinfection cycle (CIP Cleaning-in-Place)

By means of the servomotor group W3, the shaft K may also be translated in a horizontal direction Y being parallel to the axis X inside the cylindric casing Z, during the washing and disinfection cycle (CIP Cleaning-in-Place) (FIGS. 4 and 5), or it may be completely removed during the equipment A maintenance activities (FIG. 6).

According to what depicted in FIG. 5 with the related portion in cross-section, in FIG. 6, and furthermore even in FIG. 7, both the mentioned shaft K and also casing Z show their own respective cylindric peripheral surfaces S and S', outside and inside, respectively, substantially shaped with alternate pits, that is each provided with a plurality of steps GRi, GRi' being both same size and height compared to the surface S, S', and evenly placed and distanced from one another on the same surface S, S' itself.

Figure 8:
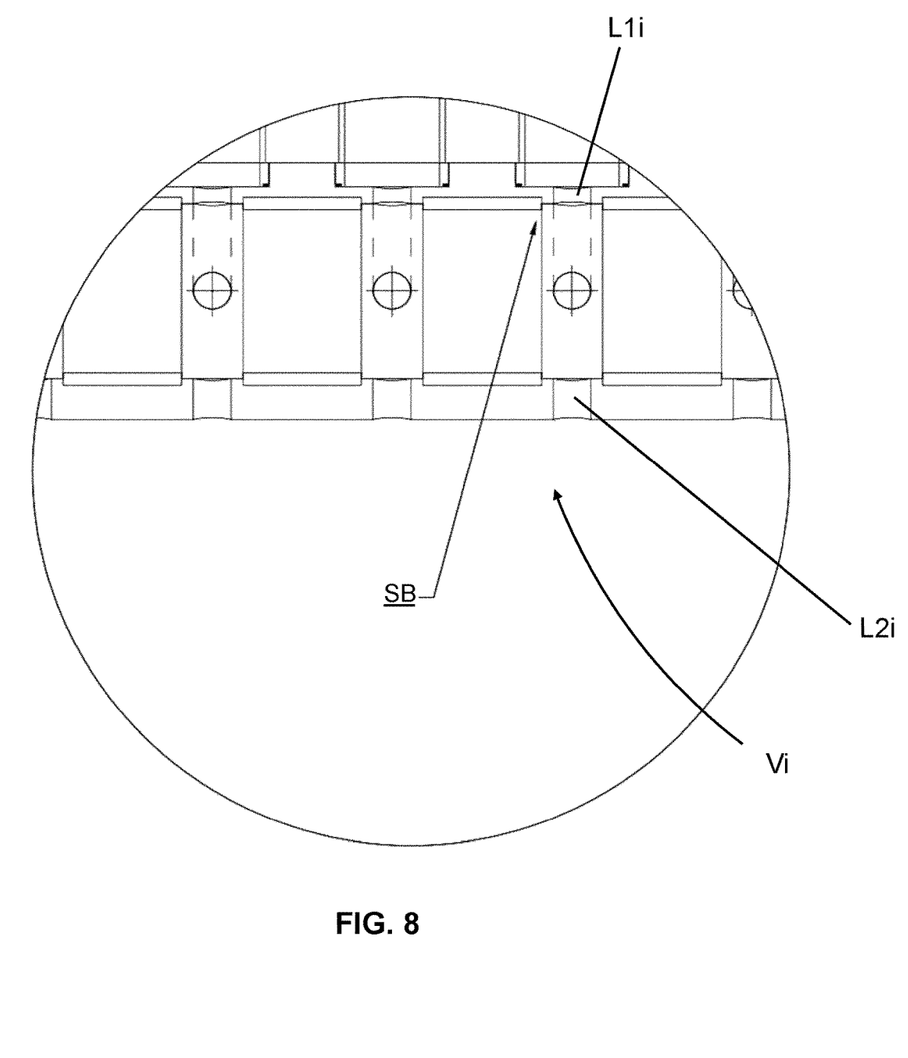
FIG. 8 is another front view in cross-section and on an enlarged scale of a portion of the equipment herein shown in the operative position of FIG. 1.
Figure 9:
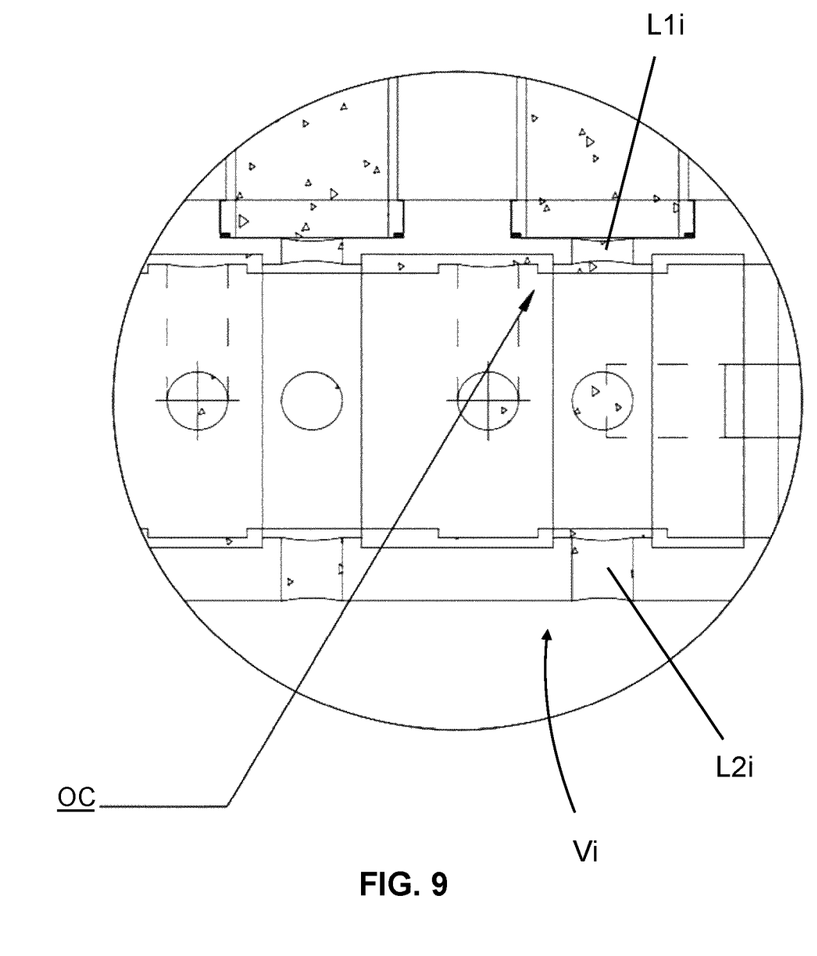
FIG. 9 is another front view in cross-section and on an enlarged scale of a portion of the equipment herein shown in the operative position of FIG. 4.

According to what better and more specifically clearly shown in FIGS. 8 and 9 on an enlarged scale, such steps GRi, GRi' are designed, due to the translation movement of the shaft K in the direction Y, to determine the obstruction between one another (position OC—FIG. 9) or the opening or release (position SB—FIG. 8) of both the mentioned lower ductwork L2i and the upper one L1i placed at the upper and lower end of the hollow body Ci of each measuring device Di, during the mentioned washing and disinfection cycle (CIP Cleaning-in-Place) of the equipment A.

Preferably the mentioned operative components of the equipment A such as pistons Pi, shaft K and/or related casing Z, that defines the valves Vi, are realized in a polymeric or equivalent material, or in a ceramic material or equivalent material.

In use, at the mentioned charging position PC, during a stage of the metering run of the equipment A, at an upwards run of the piston Pi of each measuring device Di controlled by the actuator W1 corresponds a food product feeding, through the delivering duct CAi, from the container E to each valve Vi itself, so that the measuring device Di may be progressively filled up with the food product passing through the upper ductwork L1$i$ being in communication with the duct CAi.

Afterwards at the mentioned metering position PD during a second stage of the metering production run of the equipment A, at a downward run of the piston Pi of each measuring device Di controlled by the actuator W1 corresponds the delivering of the food product from the nozzle Ui, through the upper duct L1$i$ and the lower duct L2$i$, being in communication with one another through the "T"-valve Vi itself adequately rotated in advance in position PD.

Once the metering production stages are terminated, for example before a change of the product to be delivered or after a determined period of time, the washing and disinfection cycle—CIP Cleaning-in-Place—of the equipment A is advantageously activated, without any substantial modification to the structural order of the equipment A itself, effectively and rapidly emptying the container E from the food product residuals and filling it with washing and disinfection liquid (through the inlets l1$i$ and l2$i$—FIG. 4), therefore bringing the piston Pi in an upper end position and increased section designed for the passage of the washing liquid, and making the shaft K adequately translating such that each lower duct L2$i$ communicates with the upper duct L1$i$ through the steps GRi offset on the surface S of the shaft K and the correspondent staps GRi' on the surface S' of the casing Z itself, accordingly allowing the rinsing detergent liquid to penetrate inside all the metering device Di, the shaft K and the casing Z, carrying out its complete disinfection and finally coming out from the outlets U1$i$ and U2$i$.

More in details, the washing and disinfection cycle—CIP Cleaning-in-Place—substantially involves three operative stages: hot introduction of degreasing detergent, because detergents being temperature-activated; introduction of a disinfection agent at room temperature; rinsing with water, at room temperature.

In this way, using the above-mentioned rotating valves Vi and the measuring pistons realised in ceramic material, an in itself completely inert material, the temperature variations may be considered irrelevant in relation to the movements of both the valves and the pistons themselves.

If on the contrary valves and pistons in plastic material are used, the contingent expansion susceptibility of the plastic itself is optimally compensated by the rinsing water, which is able to bring the valves and pistons back at the original temperature and in correct dimensional conditions, therefore allowing the valves and pistons themselves to go back to the initial position of the production run.

Finally it is to point out how it is effectively possible to start with a maintenance of the valves Vi simply extracting the shaft K out of the casing Z (FIG. 6) by translating the shaft K itself in the shown direction Y.

The invention claimed is:

1. Metering equipment for food products, including a plurality of metering devices each of which including plunger-cylinder means and nozzle dispenser means connected to said plunger-cylinder means and suitable for dispensing volumetric quantities of said product; many-ways-valve distributing means connected to said plunger-cylinder means and to said nozzle dispenser means placed in-between; said valve means are being formed by a shaft provided with a series of pass-through holes and suitable for turning around an own central lengthwise axis inside a cylinder casing and for translating in a horizontal direction parallel to said central axis; wherein said metering equipment includes actuators motor means said actuator means includes a centralized servomotor group configured for actuating said plurality of metering devices simultaneously, said centralized servomotor group is configured for taking said valve means from a suction and loading position of said food product in said plunger-cylinder means, in correspondence of which some higher ducts on said valve means connected to said plunger-cylinder means and some supplying ducts of said product are open and communicating one to the other, to a metering position, in correspondence of which said supplying ducts and some lower ducts on said valve means connected to nozzle means are open and communicating one to the other to dispense said food product through said nozzle means.

2. Equipment according to claim 1, wherein said shaft and said casing present their own peripheral cylindric surfaces provided with a plurality of steps, said steps being equal in shape and height to said surfaces and evenly placed and distanced one another on said surfaces.

3. Equipment according to claim 1 wherein each one of said plurality of metering means includes a battery of said plunder-cylinder means being placed vertically fixed on a tower frame.

4. Equipment according to claim 1, wherein that at least each one of said plurality of metering means and said shaft are made in a polymeric material.

5. Equipment according to claim 1, wherein at least each one of said plurality of metering means and said shaft are made in a ceramic material.

* * * * *